US012062477B2

(12) United States Patent
Inaba

(10) Patent No.: US 12,062,477 B2
(45) Date of Patent: Aug. 13, 2024

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kazuhiro Inaba, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 644 days.

(21) Appl. No.: 17/288,412

(22) PCT Filed: Oct. 9, 2019

(86) PCT No.: PCT/JP2019/039923
§ 371 (c)(1),
(2) Date: Apr. 23, 2021

(87) PCT Pub. No.: WO2020/085099
PCT Pub. Date: Apr. 30, 2020

(65) Prior Publication Data

US 2021/0358671 A1 Nov. 18, 2021

(30) Foreign Application Priority Data

Oct. 26, 2018 (JP) ................................ 2018-202371

(51) Int. Cl.
*H01F 27/25* (2006.01)
*H01F 17/04* (2006.01)
(Continued)

(52) U.S. Cl.
CPC ........... *H01F 27/025* (2013.01); *H01F 17/04* (2013.01); *H01F 27/022* (2013.01);
(Continued)

(58) Field of Classification Search
CPC ...... H01F 27/025; H01F 17/04; H01F 27/022; H01F 27/2876; H01F 27/306; H01F 27/324; H01F 27/22; H01F 37/00
(Continued)

(56) References Cited

U.S. PATENT DOCUMENTS 10,283,255 B2 5/2019 Yoshikawa
2013/0265129 A1* 10/2013 Ansari .................... H01F 27/22 336/61
(Continued)

FOREIGN PATENT DOCUMENTS

JP 2005-183885 A 7/2005
JP 2005183885 A * 7/2005
(Continued)

OTHER PUBLICATIONS

International Search Report, Application No. PCT/JP2019/039923, mailed Jan. 7, 2020. ISA/Japan Patent Office.

*Primary Examiner* — Shawki S Ismail
*Assistant Examiner* — Kazi S Hossain
(74) *Attorney, Agent, or Firm* — Honigman LLP

(57) ABSTRACT

A reactor includes an assembly of a coil and a magnetic core; a case that houses the assembly; and a sealing resin portion that seals a portion of the assembly. The reactor further includes a heat dissipation member interposed between the coil and the case. The case has an inner bottom surface and the pair of coil facing surfaces have inclined surfaces that are inclined away from each other. The coil includes a first winding portion and a second winding portion disposed opposite of the inner bottom surface with respect to the first
(Continued)

winding portion. The first winding portion and the second winding portion are parallel with each other, and have the same width. The heat dissipation member includes a first heat dissipation portion interposed between at least one of the inclined surfaces and the second winding portion.

8 Claims, 6 Drawing Sheets

(51) Int. Cl.

| | |
|---|---|
| ***H01F 27/02*** | (2006.01) |
| ***H01F 27/28*** | (2006.01) |
| ***H01F 27/30*** | (2006.01) |
| ***H01F 27/32*** | (2006.01) |

(52) U.S. Cl.
CPC ....... *H01F 27/2876* (2013.01); *H01F 27/306* (2013.01); *H01F 27/324* (2013.01)

(58) Field of Classification Search
USPC .................................................. 336/55–60, 5
See application file for complete search history.

(56) References Cited

U.S. PATENT DOCUMENTS

| | | | | |
|---|---|---|---|---|
| 2014/0292457 | A1 | 10/2014 | Shinohara et al. | |
| 2018/0122551 | A1 * | 5/2018 | Yoshikawa | H01F 37/00 |
| 2018/0190421 | A1 * | 7/2018 | Yoshikawa | H01F 27/025 |

FOREIGN PATENT DOCUMENTS

| | | | |
|---|---|---|---|
| JP | 2010-182941 | A | 8/2010 |
| JP | 2011-124242 | A | 6/2011 |
| JP | 2013-12664 | A | 1/2013 |
| JP | 2016-192432 | A | 11/2016 |
| JP | 2016192432 | A * | 11/2016 |

* cited by examiner

REACTOR

CROSS-REFERENCE TO RELATED APPLICATIONS

This application is the U.S. national stage of PCT/JP2019/039923 filed on Oct. 9, 2019, which claims priority of Japanese Patent Application No. JP 2018-202371 filed on Oct. 26, 2018, the contents of which are incorporated herein.

TECHNICAL FIELD

The present disclosure relates to a reactor.

BACKGROUND ART

A reactor according to JP 2016-207701A includes an assembly of a coil and a magnetic core, a case, and a sealing resin portion. The case houses the assembly. This case includes a bottom plate portion on which the assembly is placed, and a side wall portion that surrounds the outer periphery of the assembly. The bottom portion and the side wall portion are formed integrally with each other. The coil includes a pair of winding portions. Each of the pair of winding portions has a rectangular shape. The pair of winding portions have the same width and the same height. The pair of winding portions are arranged side by side on the bottom portion in the same plane such that the axes thereof are parallel with each other. In the following description, the side-by-side arrangement in the same plane may be referred to as a horizontal arrangement. The magnetic core includes inner core portions that are respectively disposed inside the winding portions, and outer core portions that are disposed outside the winding portions. The sealing resin portion is filled into the case to seal the assembly.

Depending on the installation target of the reactor, the installation space for the reactor may be too small to dispose the pair of winding portions in a horizontal arrangement. To install the reactor in a small installation space, it is conceivable to stack the pair of winding portions in a direction orthogonal to the installation surface so that the axes of the pair of winding portions are parallel to each other. In the following description, the arrangement in which the pair of winding portions are stacked in a direction orthogonal to the installation surface may be referred to as a vertical arrangement.

However, if the pair of winding portions that have the same width are arranged on the bottom portion of the vase in a vertical arrangement, the distance between the side surface of the upper winding portion and the side wall portion of the case that faces the side surface is greater than the distance between the side surface of the lower winding portion and the side wall portion of the case. The inner wall surfaces of the side wall portion of the case are usually provided with inclined surfaces that are inclined away from each other in a direction from the inner bottom surface of the bottom plate portion of the case to the opposite side. The case is typically manufactured through mold casting such as die casting or injection molding. The inclined surfaces of the inner wall surfaces are formed by transferring a draft provided in the mold to release the case from the mold at the time of manufacturing the case. The depth of a case for housing the pair of winding portions disposed in a vertical arrangement is deeper than the depth of the case for housing the pair of winding portions disposed in a horizontal arrangement. The deeper the case, the longer the distance between the side surface of the upper winding portion and the inner wall surface of the case.

As a result of an increase in the distance between the side surface of the upper winding portion and the inner wall surface of the case, heat is less likely to be dissipated from the upper winding portion via the inner wall surface of the case. That is to say, the lower winding portion is likely to be cooled, and the upper winding portion is less likely to be cooled. As a result, when the temperature of the upper winding portion is higher than that of the lower winding portion, the amount of loss of the reactor is large.

Therefore, one object of the present disclosure is to provide a low loss reactor that requires a small installation area.

SUMMARY

A reactor according to the present disclosure is a reactor including: an assembly of a coil and a magnetic core; a case that houses the assembly; and a sealing resin portion that is filled into the case to seal at least a portion of the assembly. The reactor further includes a heat dissipation member that is interposed between the coil and the case. The case has an inner bottom surface on which the assembly is placed, and a pair of coil facing surfaces that face side surfaces of the coil. The pair of coil facing surfaces respectively have inclined surfaces that are inclined away from each other in a direction from the inner bottom surface side to an opposite side to the inner bottom surface. The coil includes a first winding portion that is disposed on the inner bottom surface side, and a second winding portion that is disposed on an opposite side of the inner bottom surface with respect to the first winding portion, the first winding portion and the second winding portion are disposed in a vertical arrangement such that axes thereof are parallel with each other, the first winding portion and the second winding portion have the same width. The heat dissipation member includes a first heat dissipation portion that is interposed between at least one of the inclined surfaces and the second winding portion.

Advantageous Effects of Disclosure

The reactor according to the present disclosure is a low loss reactor that requires a small installation area.

DETAILED DESCRIPTION OF PREFERRED EMBODIMENTS

Figure 1:
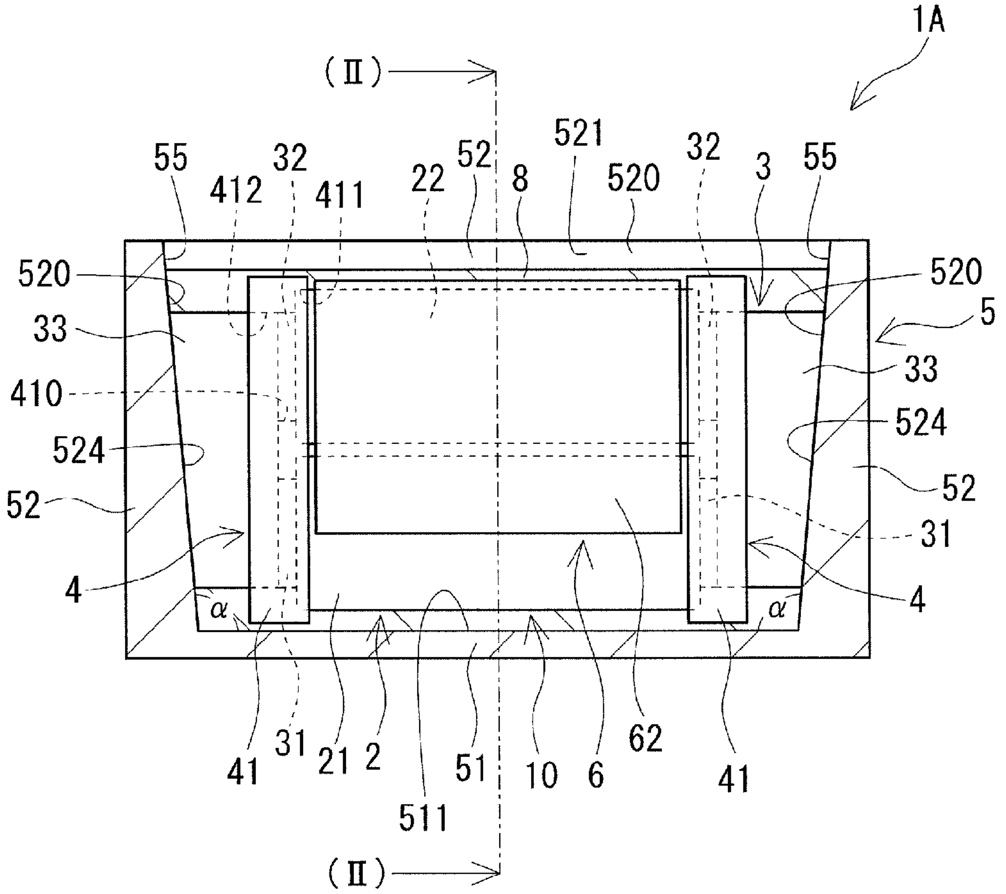
FIG. 1 is a side view showing an outline of a reactor according to a first embodiment.

First, embodiments of the present disclosure are listed and described.

A reactor according to one aspect of the present disclosure is a reactor including: an assembly of a coil and a magnetic core; a case that houses the assembly; and a sealing resin portion that is filled into the case to seal at least a portion of the assembly. The reactor further includes a heat dissipation member that is interposed between the coil and the case. The case has an inner bottom surface on which the assembly is placed, and a pair of coil facing surfaces that face side surfaces of the coil. The pair of coil facing surfaces respectively have inclined surfaces that are inclined away from each other in a direction from the inner bottom surface side to an opposite side to the inner bottom surface. The coil includes a first winding portion that is disposed on the inner bottom surface side, and a second winding portion that is disposed on an opposite side of the inner bottom surface with respect to the first winding portion, the first winding portion and the second winding portion are disposed in a vertical arrangement such that axes thereof are parallel with each other, the first winding portion and the second winding portion have the same width. The heat dissipation member includes a first heat dissipation portion that is interposed between at least one of the inclined surfaces and the second winding portion.

In the above-described reactor, the first winding portion and the second winding portion are disposed in a vertical arrangement, and therefore the installation area is small compared to when the first winding portion and the second winding portion are disposed in a horizontal arrangement. This is because the length of the assembly in the direction orthogonal to both the direction in which the first winding portion and the second winding portion are arranged in parallel and the axial direction of the coil is shorter than the length of the assembly in the direction in which the first winding portion and the second winding portion are arranged in parallel.

Also, the above-described reactor is a low loss reactor. The first winding portion and the second winding portion have the same width, and therefore the distance between one of the inclined surfaces and one of the side surfaces of the second winding portion is greater than the distance between one of the inclined surfaces and one of the side surfaces of the first winding portion. However, the gap between one of the inclined surfaces and one of the side surfaces of the second winding portion can be filled with the first heat dissipation portion. Therefore, heat from the second winding portion is more likely to be conducted to the coil facing surface of the case via the first heat dissipation portion. Therefore, the first winding portion and the second winding portion are likely to be uniformly cooled via the coil facing surfaces of the case. As a result of the first winding portion and the second winding portion being uniformly cooled, the maximum temperature of the coil is likely to be lowered. As a result of the maximum temperature of the coil being lowered, the amount of loss of the reactor is likely to be reduced. The definition of the width of the winding portions will be described later.

Furthermore, with the above-described reactor, it is possible to reduce the costs. This is because, by interposing the heat dissipation member as described above, it is possible to make heat from the second winding portion be more easily dissipated, and it is unnecessary to form the sealing resin portion with a resin or the like that has a high thermal conductivity. A resin having a high thermal conductivity can easily dissipate heat from the second winding portion even if the distance between the side surfaces of the second winding portion and the inclined surfaces is relatively large, but the costs are relatively high. The usage amount of the heat dissipation member is smaller than that of the sealing resin portion. Therefore, in the above-described reactor, even if the heat dissipation member is formed of a resin with a high thermal conductivity, for example, the costs are lower than when the sealing resin portion is formed of a resin with a high thermal conductivity, for example.

In one aspect of the above-described reactor, the first heat dissipation portion may have a length that spans from a position between one of the inclined surfaces and the second winding portion to a position between one of the inclined surfaces to the first winding portion.

In the above-described reactor, heat from the first winding portion is even more likely to be dissipated. This is because the gap between one of the inclined surfaces and one of the side surfaces of the first winding portion is filled with a portion of the first heat dissipating portion. The gap between one of the inclined surfaces and one of the side surfaces of the first winding portion is smaller than the gap between one of the inclined surfaces and one of the side surfaces of the second winding portion. Therefore, even if a portion of the heat dissipation portion is interposed between one of the inclined surfaces and one of the side surfaces of the first winding portion, heat can easily be dissipated from the first winding portion via the coil facing surface of the case. However, if a portion of the first heat dissipation portion is interposed between one of the inclined surfaces and one of the side surfaces of the first winding portion, heat from the first winding portion is more likely to be conducted to the coil facing surface of the case via the first heat dissipation portion.

In one aspect of the above-described reactor, the heat dissipation member may include a second heat dissipation portion that is interposed between the other of the inclined surfaces and the second winding portion.

In the above-described reactor, heat from the second winding portion can easily be dissipated from the two side surfaces thereof. This is because, as a result of the second heat dissipation portion being provided, heat from the second winding portion is more likely to be conducted to the coil facing surface of the case via both side surfaces of the second heat dissipation portion.

In one aspect of the above-described reactor, the second heat dissipation portion may have a length that spans from a position between the other of the inclined surfaces and the second winding portion to a position between the other of the inclined surfaces to the first winding portion.

In the above-described reactor, heat from the first winding portion is even more likely to be dissipated. The gap between the other of the inclined surfaces and the other of the side surfaces of the first winding portion is filled with a portion of the second heat dissipation portion, and therefore heat from the first winding portion is more likely to be conduct to the coil facing surface of the case via the second heat dissipation portion.

In one aspect of the above-described reactor, the heat dissipation member may include a coupling portion that is disposed on the second winding portion on an opposite side to the first winding portion, and couples the first heat dissipation portion and the second dissipation portion to each other.

In the above-described reactor, it is easier to arrange the first heat dissipation portion and the second heat dissipation portion at appropriate positions relative to the second winding portion. This is because, by disposing the coupling portion on the second winding portion on the opposite side to the first winding portion, it is possible to position the first heat dissipation portion and the second heat dissipation portion at predetermined positions in the depth direction of the case. Therefore, when the sealing resin portion is to be formed, the first heat dissipation portion and the second heat dissipation portion are likely to be prevented from being displaced due to the flow of filling resin. Examples in which the first heat dissipation portion and the second heat dissipation portion are displaced include a case in which they sink toward the inner bottom surface of the case, and a case in which they move in the axial direction of the winding portions. Also, in the above-described reactor, the coupling portion makes it possible to handle the first heat dissipation portion and the second heat dissipation portion as an integrated member, and therefore improves the manufacturing workability of the reactor. Furthermore, the coupling portion can protect the second winding portion from mechanical factors and from the external environment. By being protected from the external environment, the second winding portion is improved in the corrosion resistance properties thereof.

In one aspect of the above-described reactor, the inner bottom surface may be a flat surface, end surfaces of the first winding portion and the second winding portion may each have a rectangular frame shape, and may each have a pair of case facing sides that face the inclined surfaces and extend in a vertical direction, and a pair of coupling sides that couple respective proximal ends and respective distal ends of the pair of case facing sides to each other, and the pair of coupling sides may be parallel with the inner bottom surface.

With the above-described configuration, the distance between the side surfaces of the first winding portion and the inclined surfaces in the width direction gradually increases in a direction from the inner bottom surface side to the opposite side. Similarly, the distance between the side surfaces of the second winding portion and the inclined surfaces in the width direction gradually increases in a direction from the inner bottom surface side to the opposite side. The gap between the inclined surfaces and the side surfaces of the second winding portion is greater than the gap between the inclined surfaces and the side surfaces of the first winding portion. However, the gap between one of the inclined surfaces and one of the side surfaces of the second winding portion can be filled with the first heat dissipation portion, and therefore, heat from the second winding portion is more likely to be conducted to the coil facing surface via the first heat dissipation portion.

In one aspect of the above-described reactor, end surfaces of the first winding portion and the second winding portion may each have a rectangular frame shape, and may each have a case facing side that faces, and is parallel with, one of the inclined surfaces, and another case facing side that faces, and is not parallel with, the other of the inclined surfaces, and the first heat dissipation portion may be interposed between the other of the inclined surfaces and the other case facing side of the second winding portion.

In the above-described reactor, heat from the second winding portion can easily be dissipated from the two side surfaces thereof.

It is possible to make the distance between one of the side surfaces of the first winding portion and one of the inclined surfaces uniform, from the inner bottom surface side to the opposite side. Similarly, it is possible to make the distance between one of the side surfaces of the second winding portion and one of the inclined surfaces uniform, from the inner bottom surface side to the opposite side. Also, it is possible to make the distance between one of the side surfaces of the first winding portion and one of the inclined surfaces and the distance between one of the side surfaces of the second winding portion and one of the inclined surfaces be equal to each other. Furthermore, with the above-described reactor, it is possible to bring one of the side surfaces of the second winding portion into surface contact with one of the inclined surfaces, when necessary.

Also, the distance between the other of the side surfaces of the first winding portion and the other of the inclined surfaces in the width direction gradually increases in a direction from the inner bottom surface side to the opposite side. Similarly, the distance between the other of the side surfaces of the second winding portion and the other of the inclined surfaces in the width direction gradually increases in a direction from the inner bottom surface side to the opposite side. As a result of the first heat dissipation portion being interposed between the other of the side surfaces of the second winding portion and the other of the inclined surfaces, heat from the second winding portion is more likely to be conducted to the coil facing surface of the case from the other of the side surfaces of the second winding portion as well.

In one aspect of the above-described reactor, the heat dissipation member may have a protrusion that is interposed between the first winding portion and the second winding portion.

In the above-described reactor, the protrusion makes it easier to arrange the heat dissipation member at an appropriate position relative to the second winding portion. This is because, in the above-described reactor, as a result of the protrusion being interposed between the first winding portion and the second winding portion, it is possible to position the heat dissipation member at a predetermined position in the depth direction of the case. Therefore, when the sealing resin portion is to be formed, the heat dissipation member is likely to be prevented from being displaced due to the flow of filling resin. Examples in which the heat dissipation member is displaced include a case in which they sink toward the inner bottom surface of the case. In addition, when manufacturing the reactor, it is easy to attach the heat dissipation member to the coil. Therefore, the above-described reactor is excellent in manufacturing workability.

In one aspect of the above-described reactor, the heat dissipation member may have a thermal conductivity no less than 1 W/mK.

In the above-described reactor, heat from the second winding portion is more likely to be dissipated. This is because the heat dissipation member has a high thermal conductivity and heat from the second winding portion is more likely to be conducted to the coil facing surface of the case via the heat dissipation member.

In one aspect of the above-described reactor, the heat dissipation member may be made of metal, and the reactor may further include an insulation member that is interposed between the heat dissipation member and the second winding portion to insulate the heat dissipation member and the second winding portion.

As a result of the heat dissipation member being made of metal, heat can easily be dissipated from the second winding portion. As a result of the insulating member being provided, insulation between the second winding portion and the heat dissipation member is improved.

In one aspect of the above-described reactor, an angle formed by the inner bottom surface and each of the inclined surfaces may be no less than 91 degrees and no greater than 95 degrees.

When the aforementioned angle is no less than 91 degrees, the releasability of the case is high. The case is typically manufactured through mold casting such as die casting or injection molding. The inclined surfaces are formed by transferring a draft provided in the mold to release the case from the mold at the time of manufacturing the case. The first winding portion and the second winding portion have the same width, and therefore, when the aforementioned angle is no less than 91 degrees, if the first winding portion and the second winding portion are disposed in a vertical arrangement, the distance between the side surfaces of the second winding portion on the upper side and the inclined surfaces is likely to be greater than the distance between the side surfaces of the first winding portion on the lower side and the inclined surfaces. However, by providing the heat dissipation member interposed between the side surface of the second winding portion on the upper side and the inclined surfaces, it is possible to fill the gap between the side surface of the second winding portion on the upper side and the inclined surfaces. Therefore, heat can easily be dissipated from the second winding portion via the side wall portion of the case even in the case of the aforementioned vertical arrangement. When the aforementioned angle is no greater than 95 degrees, the angle is not excessively large. Accordingly, the width of the heat dissipation member is not excessively large. Therefore, the heat dissipation member can easily be downsized, and the usage amount of the heat dissipation member can be reduced.

The following describes details of the embodiments of the present disclosure with reference to the drawings. The same reference numerals in the figures indicate objects with the same name.

First Embodiment

Reactor

Figure 2:
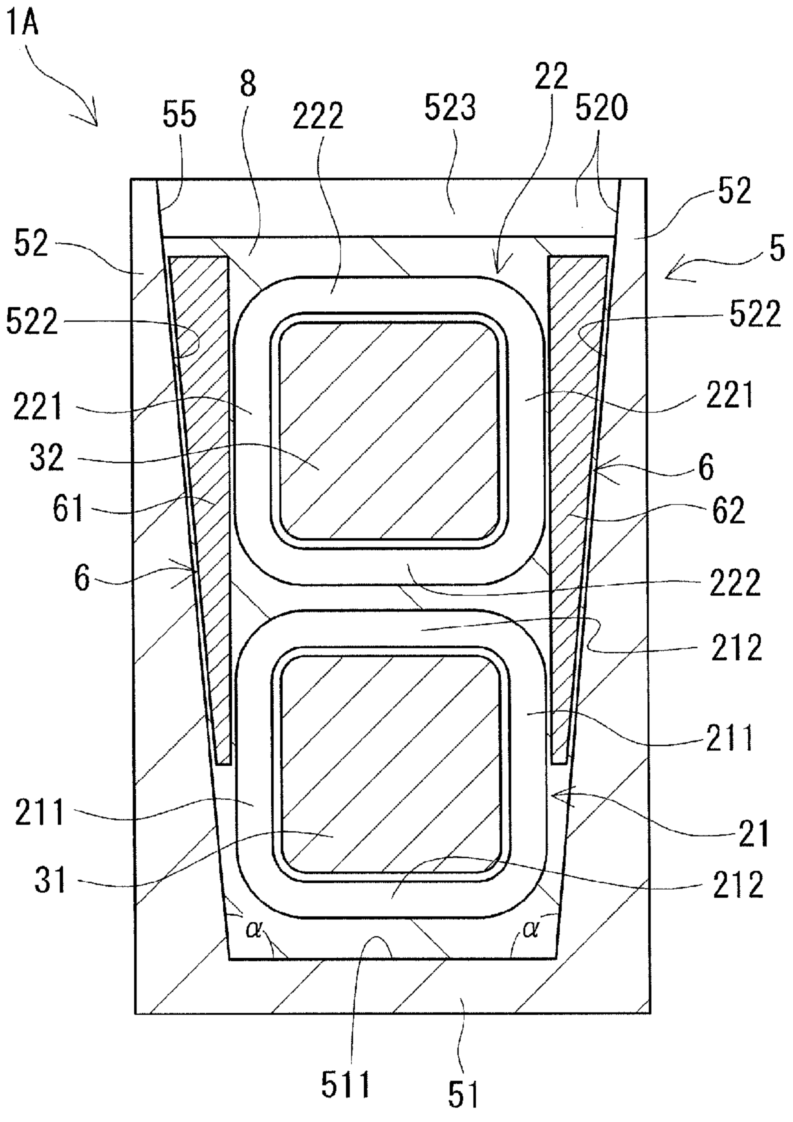
FIG. 2 is a cross-sectional view showing an outline of the reactor cut along a (II)-(II) cutting line in FIG. 1.

A reactor 1A according to a first embodiment will be described with reference to FIGS. 1 and 2. The reactor 1A includes an assembly 10 that is a combination of a coil 2 and a magnetic core 3, a case 5, a heat dissipation member 6, and a sealing resin portion 8. The case 5 includes a bottom plate portion 51 on which the assembly 10 is to be placed, and a side wall portion 52 that surrounds the outer periphery of the assembly 10. In the side wall portion 52, a pair of coil facing surfaces 521 that face the side surfaces of the coil 2 respectively have inclined surfaces 522 that are inclined from the bottom plate portion 51 side toward the opposite side of the bottom plate portion 51 so as to separate away from each other. The heat dissipation member 6 is interposed between the coil 2 and the case 5. The sealing resin portion 8 is filled into the case 5 to seal at least a portion of the assembly 10. The coil 2 includes a first winding portion 21 and a second winding portion 22 that are formed by winding wires. The first winding portion 21 is placed on the bottom plate portion 51 side. The second winding portion 22 is placed on the opposite side of the bottom plate portion 51 with respect to the first winding portion 21. The first winding portion 21 and the second winding portion 22 are disposed in a vertical arrangement such that the axes thereof are parallel with each other. One feature of the reactor 1A is that the heat dissipation member 6 includes a first heat dissipation portion 61 that is interposed between at least one coil facing surface 521 (the inclined surface 522 described below) and the second winding portion 22. The following describes main characteristic portions of the reactor 1A, the configurations of portions related to the characteristic portions, main effects, and components, in that order. Also, in the following description, it is assumed that the bottom plate portion 51 of the case 5 is on the bottom side, and the opposite side to the bottom plate portion 51 is the top side. That is to say, a direction that is parallel with this top-bottom direction is the depth direction of the case 5. In FIGS. 1 and 2, the upper side of the drawing sheets correspond to the top side, and the lower side of the drawing sheets correspond to the bottom side. A direction that is parallel with this top-bottom direction is referred to as a height direction or a vertical direction. A direction that is orthogonal to this height direction and the axial direction of the coil 2 is referred to as a width direction. In FIG. 2, the left-right direction of the drawing sheet is the width direction.

Configurations of Main Characteristic Portions and Related Portions Case

The case 5 houses the assembly 10. The case 5 can protect the assembly 10 from mechanical factors and from the external environment. By being protected from the external environment, the assembly 10 is improved in the corrosion resistance properties thereof. The case 5 can dissipate heat from the assembly 10. The case 5 is a bottomed tubular container. The case 5 includes a bottom plate portion 51 and a side wall portion 52. For the sake of illustration, the side wall portion on the near side of the drawing sheet is omitted from FIG. 1. In this example, the bottom plate portion 51 and the side wall portion 52 are formed integrally with each other. In this example, the bottom plate portion 51 and the side wall portion 52 are formed integrally with each other. In such a case, the bottom plate portion 51 and the side wall portion 52 may be integrated with each other by being screwed to each other. An opening 55 is formed on the upper end side of the side wall portion 52. The internal space surrounded by the bottom plate portion 51 and the side wall portion 52 has a shape and a size that are sufficient for housing the entire assembly 10.

Bottom Plate Portion

The bottom plate portion 51 has an inner bottom surface 511 on which the assembly 10 is to be placed and an outer bottom surface that is to be installed onto an installation target such as a cooling base. The installation target is omitted from the drawings. The bottom plate portion 51 has a rectangular flat plate shape. The inner bottom surface 511 and the outer bottom surface are flat surfaces in this example.

Side Wall Portion

The side wall portion 52 surrounds the outer periphery of the assembly 10. The side wall portion 52 is provided so as to stand on the periphery of the bottom plate portion 51. The shape of the side wall portion 52 is a rectangular frame shape in this example. The height of the side wall portion 52 is longer than the height of the assembly 10. An inner wall surface 520 of the side wall portion 52 has four surfaces, namely the pair of coil facing surfaces 521 and a pair of core facing surfaces 523 (FIG. 1). The pair of coil facing surfaces 521 face each other. The pair of core facing surfaces 523 face each other. The direction in which the pair of coil facing surfaces 521 face each other and the direction in which the pair of core facing surfaces 523 face each other are orthogonal to each other.

Coil Facing Surfaces

The coil facing surfaces 521 face side surfaces of the coil 2. That is to say, the coil facing surfaces 521 face the first winding portion 21 and the second winding portion 22. The side surfaces of the first winding portion 21 and the second winding portion 22 refer to portions of the outer peripheral surfaces of the first winding portion 21 and the second winding portion 22, the portions being located at positions in the width direction of the first winding portion 21 and the second winding portion 22. The coil facing surfaces 521 respectively have inclined surfaces 522 that are inclined away from each other in the direction from the inner bottom surface 511 side to the opening 55 side of the case 5.

Grooves into which end surface members 41 are fitted in the depth direction of the case 5 may be formed in the inclined surfaces 522 of the coil facing surfaces 521 at positions that face the end surface members 41 of a holding member 4 described below. The grooves are omitted from the drawings. If the grooves are formed, it is easier to position the assembly 10 including the coil 2, the magnetic core 3, and the holding member 4, relative to the case 5.

Core Facing Surfaces

The core facing surfaces 523 face outer end surfaces of the outer core portions 33. The outer end surfaces of the outer core portions 33 refer to surfaces of the outer core portions 33 on the opposite side to the first inner core portion 31 and the second inner core portion 32. As with the coil facing surfaces 521, the core facing surfaces 523 respectively have inclined surfaces 524 that are inclined away from each other in the direction from the inner bottom surface 511 side to the opening 55 side of the case 5.

The case 5 is typically manufactured through mold casting such as die casting or injection molding. The inclined surfaces 522 and 524 are formed by transferring a draft provided in the mold to release the case 5 from the mold at the time of manufacturing the case 5.

Inclination Angle

It is preferable that the angle (angle $\alpha$) formed by each of the inclined surfaces 522 and 524 and the inner bottom surface 511 is no less than 91 degrees and no greater than 95 degrees (FIGS. 1 and 2). In FIGS. 1 and 2, for the sake of illustration, the inclination angle of the inclined surfaces 522 and the inclined surfaces 524 is exaggerated. In this example, all of the angles formed by the inclined surfaces 522 and 524 and the inner bottom surface 511 are assumed to be the same. Note that the angle formed by the inclined surfaces 522 and the inner bottom surface 511 and the angle formed by the inclined surfaces 524 and the inner bottom surface 511 may be different from each other.

When the angle $\alpha$ is no less than 91 degrees, the releasability of the case 5 is high. The first winding portion 21 and the second winding portion 22 have the same width, and therefore, when the aforementioned angle $\alpha$ is no less than 91 degrees, if the first winding portion 21 and the second winding portion 22 are stacked in a direction orthogonal to the inner bottom surface 511 such that the axes thereof are parallel with each other, the distance between the side surface of the second winding portion 22 on the upper side and the inclined surfaces 522 is likely to be greater than the distance between the side surface of the first winding portion 21 on the lower side and the inclined surfaces 522. Here, the direction orthogonal to the inner bottom surface 511 is the depth direction of the case 5. In the following description, stacking in the depth direction of the case 5 may be referred to as vertical arrangement. However, by providing the heat dissipation member 6 interposed between the side surface of the second winding portion 22 on the upper side and the inclined surfaces 522, it is possible to fill the gap between the side surface of the second winding portion 22 on the upper side and the inclined surfaces 522. Therefore, heat can easily be dissipated from the second winding portion 22 via the side wall portion 52 of the case 5 even in the case of the aforementioned vertical arrangement. When the aforementioned angle $\alpha$ is no greater than 95 degrees, the angle is not excessively large. Accordingly, the width of the heat dissipation member 6 is not excessively large. Therefore, the heat dissipation member 6 can easily be downsized, and the usage amount of the heat dissipation member 6 can be reduced.

Material

Examples of the material of the case 5 include non-magnetic metals and non-metallic materials. Examples of non-magnetic metals include aluminum and an alloy thereof, magnesium and an alloy thereof, copper and an alloy thereof, silver and an alloy thereof, and austenitic stainless steel. The thermal conductivity of these non-magnetic metals is relatively high. Therefore, it is possible to use the case 5 as a heat dissipation path, and heat generated in the assembly 10 can be efficiently dissipated to the installation target such as a cooling base. Therefore, the reactor 1A can improve heat dissipation properties. When the case 5 is formed of a metal, die casting can be preferably used as the method for forming the case 5. Examples of non-metallic materials include resins such as a polybutylene terephthalate (PBT) resin, a urethane resin, a polyphenylene sulfide (PPS) resin, and an acrylonitrile-butadiene-styrene (ABS) resin. Such non-metal materials generally have excellent electrical insulation properties. Therefore, such non-metal materials can improve insulation between the coil 2 and the case 5. Such non-metallic materials are lighter than the aforementioned metallic materials, and can make the reactor 1A lighter. The aforementioned resins may contain a ceramic filler. Examples of ceramic fillers include alumina and silica. A resin containing such a ceramic filler has excellent heat dissipation properties and electrical insulation properties. When the case 5 is formed of a resin, injection molding can be preferably used as the method for forming the case 5. When the bottom plate portion 51 and the side wall portion 52 are to be individually molded, the bottom plate portion 51 and the side wall portion 52 may be formed of different materials.

Coil

The first winding portion 21 and the second winding portion 22 provided in the coil 2 are hollow tubular members formed by spirally winding separate wires. In the present embodiment, the first winding portion 21 and the second winding portion 22 are square tubular members. Note that the first winding portion 21 and the second winding portion 22 may be formed from a single wire. The first winding portion 21 and the second winding portion 22 are electrically connected to each other. How they are electrically connected will be described later.

A coated wire that has an insulating coating on the outer circumference of a conductor wire may be used as each of the wires constituting the first winding portion 21 and the second winding portion 22. Examples of the material of the conductor wire include copper, aluminum, and magnesium, and an alloy thereof. Examples of the type of the conductor wire include a flat wire and a round wire. Examples of the insulating coating include enamel. Typical examples of enamel include polyamide-imide.

A coated flat wire of which the conductor wire is a copper flat wire and the insulating coating is formed of enamel is used as each of the wires in this example. The first winding portion 21 and the second winding portion 22 are each constituted by an edgewise coil in which the coated flat wire is wound edgewise. The wires of the first winding portion 21 and the second winding portion 22 have the same cross-sectional areas in this example. The winding directions of the first winding portion 21 and the second winding portion 22 are the same in this example. The number of turns of the first winding portion 21 and that of the second winding portion 22 are the same. Note that the cross-sectional area of the wire and the number of turns may be different between the first winding portion 21 and the second winding portion 22.

The arrangement of the first winding portion 21 and the second winding portion 22 is a vertical arrangement in the depth direction of the case 5, in which the axes thereof are parallel with each other. The aforementioned "parallel" does not include a case where they are in the same straight line. The first winding portion 21 is placed on the bottom plate portion 51 side. The second winding portion 22 is placed upward of the first winding portion 21, i.e., on the opposite side of the bottom plate portion 51 with respect to the first winding portion 21.

The shape of the end surfaces of the first winding portion 21 and the second winding portion 22 is a rectangular frame shape (FIG. 2). The "rectangular frame shape" mentioned here may be a square frame shape. The corners of the first winding portion 21 and the second winding portion 22 are rounded. Note that the shape of the end surfaces of the first winding portion 21 and the second winding portion 22 may be a trapezoidal frame shape or the like. Examples of the trapezoidal frame shape include an isosceles trapezoidal frame shape and a right-angled trapezoidal frame shape.

The end surface of the first winding portion 21 is shaped so as to include a pair of case facing sides 211 and a pair of coupling sides 212 (FIG. 2). The pair of case facing sides 211 face the inclined surfaces 522 of the coil facing surfaces 521 of the side wall portion 52. The pair of coupling sides 212 couple the respective proximal ends and the respective distal ends of the pair of case facing sides 211 to each other. In this example, the pair of case facing sides 211 are parallel with the depth direction of the case 5. The coupling sides 212 are parallel with the inner bottom surface 511 of the bottom plate portion 51. The coupling sides 212 extend in the width direction of the case 5. Similarly, the end surface of the second winding portion 22 is shaped so as to include a pair of case facing sides 221 and a pair of coupling sides 222 (FIG. 2). The pair of case facing sides 221 face the inclined surfaces 522 of the coil facing surfaces 521 of the side wall portion 52. The pair of coupling sides 222 couple the respective proximal ends and the respective distal ends of the pair of case facing sides 221 to each other. In this example, the pair of case facing sides 221 are parallel with the depth direction of the case 5. The coupling sides 222 are parallel with the inner bottom surface 511 of the bottom plate portion 51. The coupling sides 222 extend in the width direction of the case 5.

The first winding portion 21 and the second winding portion 22 have the same height and the same width in this example. That is to say, the pair of case facing sides 211 of the first winding portion 21 and the pair of case facing sides 221 of the second winding portion 22 have the same length. The pair of coupling sides 212 of the first winding portion 21 and the pair of coupling sides 222 of the second winding portion 22 have the same length. In the case where the first winding portion 21 and the second winding portion 22 have a trapezoidal frame shape, the "same width" means that the second winding portion 22 and the first winding portion 21 have the same minimum width and the same maximum width. The height of the first winding portion 21 and the height of the second winding portion 22 may be different from each other.

The distance between the side surfaces of the first winding portion 21 and the inclined surfaces 522 in the width direction gradually increases in a direction from the inner bottom surface 511 side to the opening 55 side. Similarly, the distance between the side surfaces of the second winding portion 22 and the inclined surfaces 522 in the width direction gradually increases in a direction from the inner bottom surface 511 side to the opening 55 side. The minimum distance between the side surfaces of the second winding portion 22 and the inclined surfaces 522 in the width direction is greater than the maximum distance between the side surfaces of the first winding portion 21 and the inclined surfaces 522 in the width direction. That is to say, the distance between the side surfaces of the second winding portion 22 on the inner bottom surface 511 side and the inclined surfaces 522 in the width direction is greater than the distance between the side surfaces of the first winding portion 21 on the opening 55 side and the inclined surfaces 522 in the width direction.

Heat Dissipation Member

The heat dissipation member 6 is interposed between the coil 2 and the case 5 (FIGS. 1 and 2). The heat dissipation member 6 can conduct heat from the coil 2 to the case 5. In FIG. 2, for the sake of illustration, the thickness of the heat dissipation member 6 is exaggerated. The thickness of the heat dissipation member 6 is the length thereof in the width direction. The same applies to FIGS. 3 to 6 described below. The heat dissipation member 6 at least includes the first heat dissipation portion 61 (on the left side of the drawing sheet of FIG. 2). Preferably, the heat dissipation member 6 further includes a second heat dissipation portion 62 (on the right side of the drawing sheet of FIG. 2). The heat dissipation member 6 in this example includes a second heat dissipation portion 62 in addition to the first heat dissipation portion 61.

First Heat Dissipation Portion

The first heat dissipation portion 61 is interposed between one of the inclined surfaces 522 and a side surface of the second winding portion 22 (on the left side of the drawing sheet of FIG. 2). This first heat dissipation portion 61 can fill the gap between one of the inclined surfaces 522 and one of the side surfaces of the second winding portion 22. Therefore, even if the distance between one of the inclined surfaces 522 and one of the side surfaces of the second winding portion 22 is greater than the distance between one of the inclined surfaces 522 and one of the side surfaces of the first winding portion 21, heat from the second winding portion 22 is more likely to be conducted to the side wall portion 52 of the case 5 via the first heat dissipation portion 61. Therefore, the first winding portion 21 and the second winding portion 22 are likely to be uniformly cooled via the side wall portion 52 of the case 5. As a result of the first winding portion 21 and the second winding portion 22 being uniformly cooled, the maximum temperature of the coil 2 is likely to be lowered. As a result of the maximum temperature of the coil 2 being lowered, the amount of loss of the reactor 1A is likely to be reduced.

The first heat dissipation portion 61 is formed of a sheet-shaped member. It is preferable that the cross-sectional shape of the first heat dissipation portion 61 matches the shape of the gap between one of the inclined surfaces 522 and one of the side surfaces of the second winding portion 22. This is because such a shape makes it easier for the first heat dissipation portion 61 to fill the gap between one of the inclined surfaces 522 and one of the side surfaces of the second winding portion 22. The cross-sectional shape of the first heat dissipation portion 61 is a right-angled trapezoidal shape in this example.

The thickness of the first heat dissipation portion 61 gradually increases in a direction from the inner bottom surface 511 side to the opening 55 side. The thickness of the first heat dissipation portion 61 is the length thereof in the width direction. The surface that faces the second winding portion 22, of the first heat dissipation portion 61, is constituted by a plane that is parallel with the side surface of the second winding portion 22. The surface that faces the second winding portion 22, of the first heat dissipation portion 61, is in surface contact with the side surface of the second winding portion 22. The surface that faces the inclined surface 522, of the first heat dissipation portion 61, is constituted by a plane that is parallel with the inclined surface 522. The surface that faces the inclined surface 522, of the first heat dissipation portion 61, is in surface contact with the inclined surface 522. As a result of the first heat dissipation portion 61 and the second winding portion 22 being in surface contact with each other and the first heat dissipation portion 61 and the inclined surfaces 522 being in surface contact with each other, heat from the second winding portion 22 is more likely to be conducted to the side wall portion 52 of the case 5 via the first heat dissipation portion 61.

It is preferable that the height of the first heat dissipation portion 61 has a length that spans from the upper end of the second winding portion 22 to the lower end of the second winding portion 22. This is because such a configuration makes it possible to bring the entirety of one side surface of the second winding portion 22 in the height direction into contact with the first heat dissipation portion 61. Therefore, heat from the second winding portion 22 is more likely to be conducted to the side wall portion 52 of the case 5 via the first heat dissipation portion 61. The height of the first heat dissipation portion 61 is the length thereof in the depth direction.

The lower end of the first heat dissipation portion 61 may be located at the lower end of the second winding portion 22 or below the lower end of the second winding portion 22. That is to say, the first heat dissipation portion 61 need not be interposed between one of the inclined surfaces 522 and one of the side surfaces of the first winding portion 21, and may be interposed between one of the inclined surfaces 522 and one of the side surfaces of the first winding portion 21.

The lower end position of the first heat dissipation portion 61 may be located at the lower end of the second winding portion 22, but is preferably located lower than the lower end of the second winding portion 22 because the thermal conductivity of the first heat dissipation portion 61 is higher than the thermal conductivity of the sealing resin portion 8. Because heat from the first winding portion 21 is even more likely to be dissipated. The gap between one of the inclined surfaces 522 and one of the side surfaces of the first winding portion 21 can be filled with the lower end portion of the first heat dissipation portion 61. As described above, the gap between one of the inclined surfaces 522 and one of the side surfaces of the first winding portion 21 is smaller than the gap between one of the inclined surfaces 522 and one of the side surfaces of the second winding portion 22. Therefore, even if the lower end portion of the first heat dissipation portion 61 is not interposed in the gap between one of the inclined surfaces 522 and one of the side surfaces of the first winding portion 21, heat can easily be dissipated from the first winding portion 21 via the side wall portion 52 of the case 5. However, if the lower end portion of the first heat dissipation portion 61 is interposed between one of the inclined surfaces 522 and one of the side surfaces of the first winding portion 21, heat from the first winding portion 21 is more likely to be conducted to the side wall portion 52 via the first heat dissipation portion 61.

That is to say, it is preferable that the height of the first heat dissipation portion 61 has a length that spans from the upper end of the second winding portion 22 to a position below the upper end of the first winding portion 21. Furthermore, it is preferable that the height of the first heat dissipation portion 61 has a length that spans from the upper end of the second winding portion 22 to the lower end of the first winding portion 21. In the present example, the height of the first heat dissipation portion 61 has a length that spans from a position above the upper end of the second winding portion 22 to a position between the upper end and the lower end of the first winding portion 21.

It is preferable that the length of the first heat dissipation portion 61 is equivalent to the total length of the second winding portion 22 in the axial direction. The length of the first heat dissipation portion 61 is the length thereof in the axial direction of the second winding portion 22. When the length of the first heat dissipation portion 61 is equivalent to the total length of the second winding portion 22 in the axial direction, it is possible to bring a substantially entire range of one of the side surfaces of the second winding portion 22 in the axial direction into contact with the first heat dissipation portion 61. Therefore, heat from the second winding portion 22 is more likely to be conducted to the side wall portion 52 of the case 5 via the first heat dissipation portion 61.

Second Heat Dissipation Portion

The second heat dissipation portion 62 is interposed between the other of the inclined surfaces 522 and the other side surface of the second winding portion 22 (on the right side of the drawing sheet of FIG. 2). As a result of the heat dissipation member 6 including the second heat dissipation portion 62, heat from the second winding portion 22 is more likely to be conducted from the other side surface of the second winding portion 22 to the side wall portion 52 of the case 5 via the second heat dissipation portion 62. The second heat dissipation portion 62 may have the same configuration as the first heat dissipation portion 61.

Material

It is preferable that the material of the heat dissipation member 6 has a higher thermal conductivity than the sealing resin portion 8. As a result of the heat dissipation member 6 having a higher thermal conductivity than the sealing resin portion 8, heat from the second winding portion 22 is more likely to be conducted to the side wall portion 52 of the case 5. Preferably, the thermal conductivity of the heat dissipation member 6 is no less than 1 W/mK, for example. When the thermal conductivity of the heat dissipation member 6 is no less than 1 W/mK, heat can easily be dissipated from the second winding portion 22. The thermal conductivity of the heat dissipation member 6 is more preferably no less than 3 W/mK, and particularly preferably no less than 5 W/mK. Although the upper value of the thermal conductivity of the heat dissipation member 6 is not particularly limited, it may be approximately 100 W/mK, for example. As with the material of the case 5, examples of the material of the heat dissipation member 6 include non-magnetic metals and non-metallic materials.

Magnetic Core

The magnetic core 3 includes a first inner core portion 31, a second inner core portion 32, and a pair of outer core portions 33 (FIG. 1).

The first inner core portion 31 and the second inner core portion 32 are respectively arranged inside the first winding portion 21 and the second winding portion 22. The first inner core portion 31 and the second inner core portion 32 are portions that extend in the axial direction of the first winding portion 21 and the second winding portion 22, of the magnetic core 3. In this example, the end portions of the magnetic core 3 in the axial direction of the first winding portion 21 and the second winding portion 22 protrude outward from the first winding portion 21 and the second winding portion 22, and the protruding portions are portions of the first inner core portion 31 and the second inner core portion 32. The pair of outer core portions 33 are arranged outside the first winding portion 21 and the second winding portion 22. That is to say, the outer core portions 33 are portions where the coil 2 is not provided, protrude from the coil 2, and exposed to the outside from the coil 2.

The magnetic core 3 is formed by bringing the end surfaces of the first inner core portion 31 and the second inner core portion 32 into contact with the inner end surfaces of the outer core portions 33 so as to have ring shape. That is to say, the pair of outer core portions 33 are arranged so as to sandwich the first inner core portion 31 and the second inner core portion 32 that are arranged apart from each other. Due to the first inner core portion 31, the second inner core portion 32, and the pair of outer core portions 33, a closed magnetic path is formed when the coil 2 is excited.

Inner Core Portions

It is preferable that the shape of the first inner core portion 31 and the shape of the second inner core portion 32 respectively match the shape of the inner circumference of the first winding portion 21 and the shape of the inner circumference of the second winding portion 22. This is because such a configuration makes it easier to make the distance between the inner circumferential surface of the first winding portion 21 and the outer circumferential surface of the first inner core portion 31 uniform in the circumferential direction of the first inner core portion 31. Another reason is that such a configuration makes it easier to make the distance between the inner circumferential surface of the second winding portion 22 and the outer circumferential surface of the second inner core portion 32 uniform in the circumferential direction of the second inner core portion 32. In this example, the first inner core portion 31 and the second inner core portion 32 have a rectangular parallelepiped shape. The corners of the first inner core portion 31 and the second inner core portion 32 are rounded so as to match the inner circumferential surfaces at the corners of the first winding portion 21 and the second winding portion 22.

In this example, the first inner core portion 31 and the second inner core portion 32 have the same height. The first inner core portion 31 and the second inner core portion 32 have the same width. Therefore, the distance between the inner circumferential surface of the first winding portion 21 and the outer circumferential surface of the first inner core portion 31 is the same as the distance between the inner circumferential surface of the second winding portion 22 and the outer circumferential surface of the second inner core portion 32.

The first inner core portion 31 and the second inner core portion 32 in this example are each formed of one columnar core piece. Each core piece is formed without a gap. The core pieces have a length that spans a substantially entire length of the first winding portion 21 and the second winding portion 22 in the axial direction thereof. Note that the first inner core portion 31 and the second inner core portion 32 may each be formed of a stacked member in which a plurality of columnar core pieces and gaps are stacked in the axial direction of the coil 2.

Outer Core Portions

Examples of the shape of the outer core portions 33 include a rectangular parallelepiped shape and a quadrangular pyramid shape. The rectangular parallelepiped shape is a rectangular column member in which the outer end surface, the side surfaces, the upper surface, and the lower surface are all rectangular in each of the outer core portions 33. The upper surface and the lower surface have the same area. Examples of the quadrangular pyramid shape include the shape of a rectangular column member in which the outer end surface, the upper surface, and the lower surface are rectangular and the side surfaces are right-angled trapezoidal in each of the outer core portions 33. In the outer core portions 33 that have a quadrangular pyramid shape, the area of the upper surface is greater than the area of the lower surface.

The outer core portions 33 in this example have a quadrangular pyramid shape. Specifically, examples of the quadrangular pyramid shape include the shape of a rectangular column member in which the outer end surface, the upper surface, and the lower surface are rectangular and the side surfaces are right-angled trapezoidal in each of the outer core portions 33 (FIG. 1). It is preferable that the outer end surfaces of each of the outer core portions 33 are constituted by surfaces that are parallel with the inclined surfaces 524 of the core facing surfaces 523. This is because such a configuration makes it possible to bring the outer end surfaces of the outer core portions 33 and the inclined surfaces 524 of the core facing surfaces 523 into surface contact. As a result of such surface contact, heat from the outer core portions 33 is more likely to be conducted to the side wall portion 52 of the case 5. Therefore, the heat dissipation properties of the magnetic core 3 can be improved. In addition, it is possible to press the pair of outer core portions 33 in a direction in which they come close to each other. Therefore, the magnetic core 3 is less likely to be displaced relative to the case 5.

In this example, the upper surfaces of the outer core portions 33 are substantially flush with the upper surface of the second inner core portion 32. In this example, the lower surfaces of the outer core portions 33 are substantially flush with the lower surface of the first inner core portion 31. Note that the upper surfaces of the outer core portions 33 may be located at positions higher than the upper surface of the second inner core portion 32. The lower surfaces of the outer core portions 33 may be located at positions lower than the lower surface of the first inner core portion 31.

Sealing Resin Portion

The sealing resin portion 8 is filled into the case 5 to cover at least a portion of the assembly 10. The sealing resin portion 8 has various functions such as conducting heat from the assembly 10 to the case 5, protecting the assembly 10 from mechanical factors and from the external environment, improving the corrosion resistance properties of the assembly 10, improving electrical insulation between the assembly 10 and the case 5, unifying the assembly 10, and improving the strength and rigidity of the reactor 1A as a result of integrating the assembly 10 and the case 5 with each other.

The sealing resin portion 8 in this example is substantially entirely embedded in the assembly 10. The sealing resin portion 8 includes a portion that is interposed between the coil 2 and the case 5. Specifically, the sealing resin portion 8 is interposed between the lower surface of the first winding portion 21 and the inner bottom surface 511 of the bottom plate portion 51, and between the lower end portions of the side surfaces of the first winding portion 21 and the coil facing surfaces 521 of the side wall portion 52. In addition, the sealing resin portion 8 is interposed between the upper surface of the first winding portion 21 and the lower surface of the second winding portion 22. Heat from the first winding portion 21 is conducted to the case 5 via the sealing resin portion 8.

Examples of the material of the sealing resin portion 8 include a thermosetting resin and a thermoplastic resin. Examples of thermosetting resins include an epoxy resin, a urethane resin, a silicone resin, and an unsaturated polyester resin. Examples of thermoplastic resins include a PPS resin. These resins may contain the above-described ceramic filler or the like.

Actions and Effects of Main Characteristic Portions of Reactor

The reactor 1A according to the first embodiment can achieve the following effects.

The first winding portion 21 and the second winding portion 22 are disposed in a vertical arrangement, and therefore the installation area is small compared to when the first winding portion 21 and the second winding portion 22 are disposed in a horizontal arrangement. This is because the length of the assembly 10 in the direction orthogonal to both the direction in which the first winding portion 21 and the second winding portion 22 are arranged in parallel and the axial direction of the coil 2 is shorter than the length of the assembly 10 in the direction in which the first winding portion 21 and the second winding portion 22 are arranged in parallel.

The amount of loss is small. The gap between one of the inclined surfaces 522 and one of the side surfaces of the second winding portion 22 can be filled with the first heat dissipation portion 61. Also, the gap between the other of the inclined surfaces 522 and the other of the side surfaces of the second winding portion 22 can be filled with the second heat dissipation portion 62. Therefore, even if the distance between the inclined surfaces 522 and the side surfaces of the second winding portion 22 is large compared to the distance between the inclined surfaces 522 and the side surfaces of the first winding portion 21, heat from the second winding portion 22 is more likely to be conducted from the both side surfaces of the second winding portion 22 to the side wall portion 52 of the case 5 via the first heat dissipation portion 61 and the second heat dissipation portion 62. Therefore, heat can be easily dissipated from the second winding portion 22, and therefore the first winding portion 21 and the second winding portion 22 are likely to be uniformly cooled via the side wall portion 52 of the case 5. As a result of the first winding portion 21 and the second winding portion 22 being uniformly cooled, the maximum temperature of the coil 2 is likely to be lowered. As a result of the maximum temperature of the coil 2 being lowered, the amount of loss of the reactor 1A is likely to be reduced.

Descriptions of Components Including Other Characteristic Portions Coil

Although not shown in the drawings, the conductors at the proximal ends of the coil 2 in the axial direction thereof are directly connected to each other. For example, the conductors are connected to each other by bending an end portion of the winding wire of the first winding portion 21 and extending it to an end portion of the winding wire of the second winding portion 22. Note that the conductors may be connected to each other via a connection member that is independent of the first winding portion 21 or the second winding portion 22. The connection member may be formed of the same material as the winding wires, for example. The conductors can be connected through welding or pressure welding.

On the other hand, although not shown in the drawings, the ends of the winding wires at the distal end of the coil 2 in the axial direction thereof are extended upward from the opening 55 of the case 5. The insulating coating on the end portions of each winding wire is peeled off so that the conductor thereof is exposed to the outside. A terminal member is connected to each exposed conductor. An external device such as a power supply that supplies power to the coil 2 is connected to the coil 2 via such a terminal member. The terminal member and the external device are omitted from the drawings.

The first winding portion 21 and the second winding portion 22 may individually be unified using a unifying resin. The unifying resin is omitted from the drawings. The unifying resin covers the outer circumferential surfaces, the inner circumferential surfaces, and the end surfaces of the first winding portion 21 and the second winding portion 22, and joins adjacent turns to each other. The unifying resin can be formed by using a resin that has a coating layer of a thermal fusion resin formed on the outer circumference of a winding wire, winding the winding wire, and thereafter heating and melting the coating layer. The outer circumference of a winding wire means the outer circumference of the insulating coating of the winding wire. Examples of types of thermal fusion resins include thermosetting resins such as an epoxy resin, a silicone resin, and an unsaturated polyester.

Magnetic Core

Material

The first inner core portion 31, the second inner core portion 32, and the outer core portions 33 are formed of a powder compact or a composite material. The powder compact is formed by performing compression molding of soft magnetic powder. With a powder compact, it is possible to increase the proportion of soft magnetic powder in the core pieces compared to a composite material. Therefore, with a powder compact, it is easier to improve the magnetic properties. Examples of magnetic properties include a relative magnetic permeability and a saturation magnetic flux density. The composite material is formed by dispersing soft magnetic powder in a resin. The composite material is obtained by filling a mold with a fluid material formed by dispersing soft magnetic powder in an unsolidified resin, and curing the resin. With a composite material, it is easy to adjust the amount of soft magnetic power contained in the resin. Therefore, with a composite material, it is easy to adjust the aforementioned magnetic properties. In addition, with a composite material, it is easier to form a complicated shape compared to powder compact. Note that the first inner core portion 31, the second inner core portion 32, and the outer core portions 33 may be formed as a hybrid core in which the outer circumference of a powder compact is covered by a composite material. In this example, the first inner core portion 31 and the second inner core portion 32 are formed of a composite material. The pair of outer core portions 33 are formed of a powder compact.

Examples of the particles that constitute soft magnetic powder include soft magnetic metal particles, coated particles in which the outer circumferential surfaces of the soft magnetic metal particles are provided with an insulating coating, and soft magnetic non-metal particles. Examples of soft magnetic metals include pure iron and an iron-based alloy. Examples of iron-based alloys include an Fe—Si alloy and an Fe—Ni alloy. Examples of soft magnetic non-metals include a ferrite. A thermosetting resin or a thermoplastic resin can be used as the resin of the composite material, for example. Examples of thermosetting resins include an epoxy resin, a phenol resin, a silicone resin, and a urethane resin. Examples of thermoplastic resins include PPS resins, polyamide (PA) resins, liquid crystal polymers (LCP), polyimide resins, and fluororesins. Examples of PA resins include a nylon 6, a nylon 66, and a nylon 9T. These resins may contain the above-described ceramic filler. The gaps are made of a material having a lower relative magnetic permeability than the first inner core portion 31, the second inner core portion 32, or the outer core portion 33.

The relative magnetic permeability of the first inner core portion 31 and the second inner core portion 32 is preferably no less than 5 and no greater than 50, more preferably no less than 10 and no greater than 30, and particularly preferably no less than 20 and no greater than 30. The relative magnetic permeability of the outer core portions 33 is preferably at least two-fold of the relative magnetic permeability of the first inner core portion 31 and the second inner core portion 32. The relative magnetic permeability of the outer core portions 33 is preferably no less than 50 and no greater than 500.

Holding Member

The assembly 10 may be provided with a holding member 4 (FIG. 1). The holding member 4 ensures insulation between the coil 2 and the magnetic core 3. The holding member 4 in this example has a pair of end surface members 41.

End Surface Members

The end surface members 41 ensure insulation between end surfaces of the coil 2 and the outer core portions 33. The end surface members 41 have the same shape. The end surface members 41 are frame-shaped plate members in which two through holes 410 are provided in the direction in which the first winding portion 21 and the second winding portion 22 are stacked. End portions of the first inner core portion 31 and the second inner core portion 32 are fitted into the through holes 410. Two recesses 411 for accommodating the end surfaces of the first winding portion 21 and the second winding portion 22 are formed in the coil 2-side surfaces of the end surface members 41. Due to the recesses 411 on the coil 2 side, the entire end surfaces of the first winding portion 21 and the second winding portion 22 come into surface contact with the end surface members 41. The recesses 411 are formed into a rectangular ring shape so as to surround the peripheries of the through holes 410, respectively. The outer core portions 33-side surfaces of the end surface members 41 are each provided with one recess 412 into which an outer core portion 33 can be fitted.

Inner Member

Although not shown in the drawings, the holding member 4 may further include an inner member. The inner member ensures insulation between the inner circumferential surfaces of the first winding portion 21 and the second winding portion 22 and the outer circumferential surfaces of the first inner core portion 31 and the second inner core portion 32.

Material

Examples of the material of the holding member 4 include insulating materials such as various resins. Examples of resins include the same resins as in the above-described composite material. Examples of other thermoplastic resins include a polytetrafluoroethylene (PTFE) resin, a PBT resin, and an ABS resin. Examples of other thermosetting resins include an unsaturated polyester resin. In particular, it is preferable that the material of the holding member 4 is the same as the material of the sealing resin portion 8. This is because such a configuration makes it possible to make the linear expansion coefficients of the holding member 4 and the sealing resin portion 8 the same, and makes it possible to suppress damage to each member caused due to thermal expansion and contraction.

Mold Resin Portion

Although not shown in the drawings, the assembly 10 may include a mold resin portion. The mold resin portion covers the outer core portions 33 and extends to the inside of the first winding portion 21 and the second winding portion 22. The mold resin portion covers the outer circumferential surfaces of the outer core portions 33 except for the coupling surfaces of the first inner core portion 31 and the second inner core portion 32. The mold resin portion is interposed between the outer core portions 33 and the recesses 412 of the end surface members 41, between the outer circumferential surfaces of the first inner core portion 31 and the second inner core portion 32 and the through holes 410 of the end surface members 41, and between the inner circumferential surfaces of the first winding portion 21 and the second winding portion 22 and the outer circumferential surfaces of the first inner core portion 31 and the second inner core portion 32. This mold resin portion can integrate the outer core portions 33, the end surface members 41, and the first inner core portion 31, and the second inner core portion 32, the first winding portion 21, and the second winding portion 22, with each other. Examples of the material of the mold resin portion include the same thermosetting resins and thermoplastic resins as in the above-described composite material. These resins may contain the above-described ceramic filler. By including the ceramic filler in the mold resin portion, it is possible to improve the heat dissipation properties of the mold resin portion.

Mode of Usage

The reactor 1A can be used as a component of a circuit that performs voltage step-up and step-down operations. The reactor 1A can be used as a constituent component of various converters and power conversion devices, for example. Examples of converters include on-board converters to be mounted on vehicles such as hybrid vehicles, plug-in hybrid vehicles, electric vehicles, and fuel cell vehicles, and converters for air conditioners. Typical examples of on-board converters include a DC-DC converter.

Second Embodiment

Reactor

Figure 3:
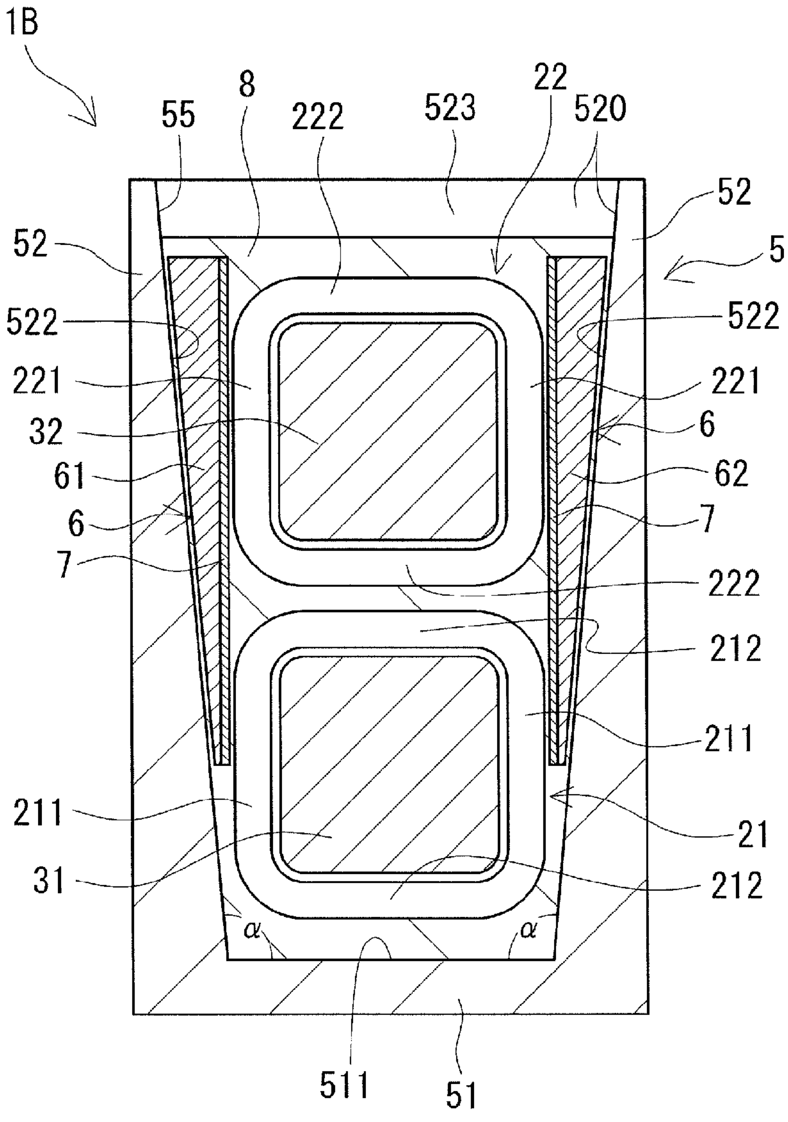
FIG. 3 is a cross-sectional view showing an overview of a reactor according to a second embodiment.

A reactor 1B according to a second embodiment will be described with reference to FIG. 3. In the reactor 1B according to the second embodiment, the first heat dissipation portion 61 and the second heat dissipation portion 62 are made of metal. The reactor 1B according to the second embodiment is different from the reactor 1A according to the first embodiment in that the reactor 1B includes an insulating member 7. The following mainly describes this difference. Descriptions of the same components will be omitted. The same applies to the third to fifth embodiments described below. FIG. 3 is a cross-sectional view showing the reactor 1B cut along the same position as in the cross-sectional view in FIG. 2.

Insulating Member

The insulating member 7 insulates the heat dissipation member 6 and the second winding portion 22 from each other. That is to say, the insulating member 7 insulates the first heat dissipation portion 61 and the second heat dissipation portion 62 from the second winding portion 22. Although the heat dissipation member 6 and the second winding portion 22 can be insulated by the insulating coating on the winding wire of the second winding portion 22, it is possible to further improve insulation by providing the insulating member 7. As with the material of the case 5, examples of the material of the insulating member 7 include non-metallic materials. The insulating member 7 may be formed integrally with the heat dissipation member 6 or formed as a member separate from the heat dissipation member 6. In this example, the insulating member 7 is formed integrally with the heat dissipation member 6.

The areas covered by the insulating member 7 may be areas that face the second winding portion 22, of the first heat dissipation portion 61 and the second heat dissipation portion 62. When the lower ends of the first heat dissipation portion 61 and the second heat dissipation portion 62 extend to the first winding portion 21 side as in this example, it is preferable that the insulating member 7 is also formed on areas that face the first winding portion 21, of the first heat dissipation portion 61 and the second heat dissipation portion 62. Such a configuration improves insulation between the heat dissipation member 6 and the first winding portion 21.

It is preferable that the insulating member 7 is as thin as possible on the condition that it can improve the insulating properties thereof. This is because heat from the second winding portion 22 can be easily conducted to the side wall portion 52 of the case 5 via the heat dissipation member 6 even if the insulating member 7 is provided. The thickness of the insulating member 7 is the length thereof in the width direction. The thickness of the insulating member 7 is preferably no less than 0.1 mm, for example. If the thickness of the insulating member 7 is no less than 0.1 mm, it is easier to improve the insulation properties. The thickness of the insulating member 7 is preferably no greater than 2.0 mm, for example. If the thickness of the insulating member 7 is no greater than 2.0 mm, it is easier to dissipate heat from the second winding portion 22. The thickness of the insulating member 7 is more preferably no greater than 1.0 mm, and particularly preferably no greater than 0.5 mm.

Actions and Effects

In the reactor 1B according to the second embodiment, heat from the second winding portion 22 can easily be dissipated from the two side surfaces thereof. This is because the first heat dissipation portion 61 and the second heat dissipation portion 62 are made of metal, and heat from the second winding portion 22 is more likely to be conducted from both side surfaces of the second winding portion 22 to the side wall portion 52 of the case 5 via the first heat dissipation portion 61 and the second heat dissipation portion 62. In addition, the first heat dissipation portion 61 and the second heat dissipation portion 62 are more effectively insulated from the coil 2. This is because the insulating member 7 is formed on the areas that face the coil 2, of the first heat dissipation portion 61 and the second heat dissipation portion 62.

Third Embodiment

Reactor

Figure 4:
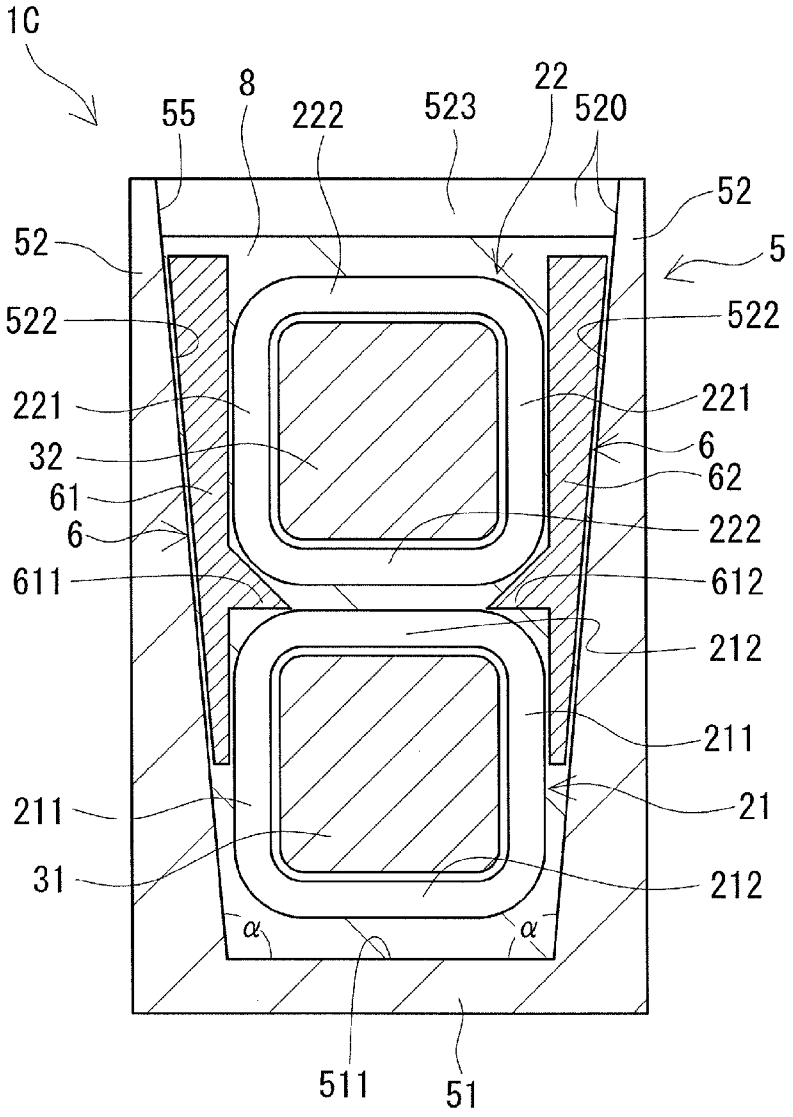
FIG. 4 is a cross-sectional view showing an overview of a reactor according to a third embodiment.

A reactor 1C according to a third embodiment will be described with reference to FIG. 4. The reactor 1C according to the third embodiment is different from the reactor 1A according to the first embodiment in that the first heat dissipation portion 61 and the second heat dissipation portion 62 are respectively provided with protrusions 611 and 621. FIG. 4 is a cross-sectional view showing the reactor 1C cut along the same position as in the cross-sectional view in FIG. 2.

Heat Dissipation Member

Protrusions

The protrusions 611 and 621 are interposed between the first winding portion 21 and the second winding portion 22. The protrusions 611 and 621 make it easier to arrange the first heat dissipation portion 61 and the second heat dissipation portion 62 at appropriate positions relative to the second winding portion 22. This is because, as a result of the protrusions 611 and 621 being interposed between the first winding portion 21 and the second winding portion 22, the first heat dissipation portion 61 and the second heat dissipation portion 62 can be positioned at appropriate positions in the depth direction of the case 5. Therefore, when the sealing resin portion 8 is to be formed, the first heat dissipation portion 61 and the second heat dissipation portion 62 are likely to be prevented from being displaced due to the flow of filling resin. Examples in which the first heat dissipation portion 61 and the second heat dissipation portion 62 are displaced include a case in which they sink toward the inner bottom surface 511 of the case 5. In addition, when manufacturing the reactor 1C, it is easier to attach the first heat dissipation portion 61 and the second heat dissipation portion 62 to the coil 2. Therefore, the reactor 1C is excellent in manufacturing workability.

The protrusions 611 and 621 are formed so as to protrude toward the coil 2 from surfaces that face the coil 2, of the first heat dissipation portion 61 and the second heat dissipation portion 62. The protrusions 611 and 621 may be protruding ridges that are continuously formed in the lengthwise direction thereof, or constituted by a plurality of protruding pieces. The plurality of protruding pieces may be provided at intervals in the axial direction of the second winding portion 22. The constituent resin of the sealing resin portion 8 is likely to flow from the gap between the protruding pieces, in the top-bottom direction of the case 5. Examples of the cross-sectional shape of the protrusions 611 and 621 include a triangular shape, a rectangular shape, a semicircular shape, and an angled shape having a curved surface extending along the corners of the first winding portion 21 and the second winding portion 22. When the cross-sectional shape of the protrusions 611 and 621 is an angled shape, the protrusions 611 and 621 can be brought into close contact with both corners of the first winding portion 21 and the second winding portion 22. Therefore, more effective heat dissipation from the second winding portion 22 can be expected.

In the example, the cross-sectional shape of the protrusions 611 and 621 is a right-angled triangle shape that tapers toward the tip. The lower side of the two sides, namely the upper side and the lower side that form the protruding portion of each of the protrusions 611 and 621, is parallel with the coupling sides 212 of the first winding portion 21, and the upper side thereof is an inclined side. As a result of the lower side being parallel with the coupling sides 212, the lower side can be abutted against, and attached to, the first winding portion 21. Therefore, when forming the sealing resin portion 8, it is possible to prevent the first heat dissipation portion 61 and the second heat dissipation portion 62 from sinking toward the inner bottom surface 511 of the case 5 as a result of resin being poured from the side of the opening 55 of the case 5. Note that the upper side of the right-angled triangle may be parallel with the connecting side 222 of the second winding portion 22, and the lower side may be an inclined side. As a result of the upper side being parallel with the coupling sides 222, the upper side can be abutted against, and attached to, the second winding portion 22. Therefore, when forming the sealing resin portion 8, it is possible to prevent the first heat dissipation portion 61 and the second heat dissipation portion 62 from rising toward the opening 55 of the case 5 as a result of the bulk of the filling resin increasing.

The length of the protrusions 611 and 621 is preferably no less than 50% of the length of the second winding portion 22 in the axial direction. This is because such a configuration makes the first heat dissipation portion 61 and the second heat dissipation portion 62 less likely to be displaced relative to the second winding portion 22. The length of the protrusions 611 and 621 is the length thereof in the axial direction of the second winding portion 22. The length of the protrusions 611 and 621 is more preferably no less than 75% of the length of the second winding portion 22 in the axial direction, and is particularly preferably equivalent to the total length of the second winding portion 22 in the axial direction thereof. When the protrusions 611 and 621 are formed as a plurality of protruding pieces, the length of the protrusions 611 and 621 is the total length of the plurality of protruding pieces in the axial direction of the second winding portion 22.

Note that the areas on which the protrusions 611 and 621 are in contact with the coil 2 may be provided with the insulating member 7 (FIG. 3). The protrusions 611 and 621 being made of metal can improve insulation between the protrusions 611 and 621 and the coil 2.

Method for Manufacturing Reactor

The reactor 1C can be manufactured in the following manner. An assembled member formed by attaching the heat dissipation member 6 to the assembly 10 is housed in the case 5. Thereafter, the constituent resin of the sealing resin portion 8 is filled into the case 5 and is cured. By attaching the heat dissipation member 6 to the assembly 10 before housing the assembly 10 in the case 5, it is easier to interpose the heat dissipation member 6 between the inclined surfaces 522 of the case 5 and the second winding portion 22.

Actions and Effects

In the reactor 1C according to the third embodiment, heat from the second winding portion 22 can easily be dissipated from the two side surfaces thereof. This is because, as a result of the first heat dissipation portion 61 and the second heat dissipation portion 62 being provided with the protrusions 611 and 621, the first heat dissipation portion 61 and the second heat dissipation portion 62 can easily be positioned at appropriate positions relative to the second winding portion 22. Therefore, heat from the second winding portion 22 is more likely to be conducted to the side wall portion 52 of the case 5 from the two side surfaces of the second winding portion 22 via the first heat dissipation portion 61 and the second heat dissipation portion 62.

Fourth Embodiment

Reactor

Figure 5:
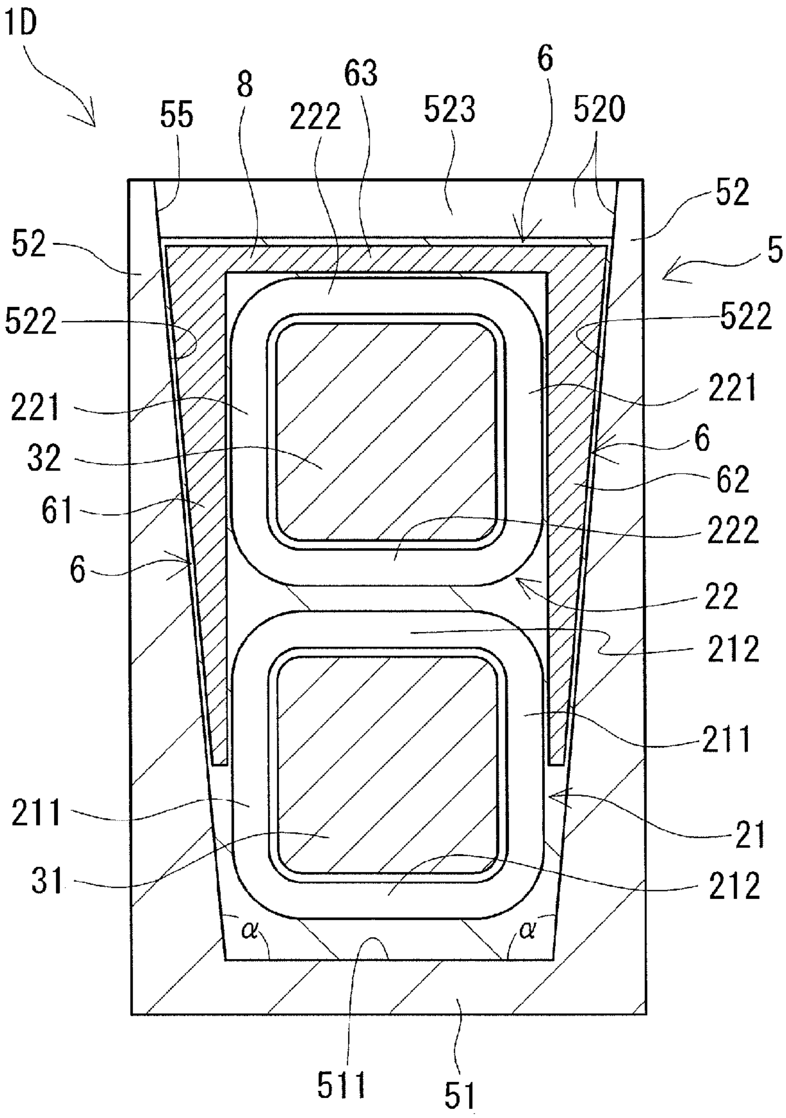
FIG. 5 is a cross-sectional view showing an overview of a reactor according to a fourth embodiment.

A reactor 1D according to a fourth embodiment will be described with reference to FIG. 5. The reactor 1D according to the fourth embodiment is different from the reactor 1A according to the first embodiment in that the heat dissipation member 6 includes a coupling portion 63. FIG. 5 is a cross-sectional view showing the reactor 1D cut along the same position as in the cross-sectional view in FIG. 2.

Heat Dissipation Member

Coupling Portion

The coupling portion 63 couples the upper ends of the first heat dissipation portion 61 and the second heat dissipation portion 62 to each other. The coupling portion 63 is placed on the upper surface of the second winding portion 22, i.e., on the opposite side to the first winding portion 21 on the second winding portion 22. This coupling portion 63 makes it easier to arrange the first heat dissipation portion 61 and the second heat dissipation portion 62 at appropriate positions relative to the second winding portion 22. This is because, as a result of the coupling portion 63 being disposed on the upper surface of the second winding portion 22, the first heat dissipation portion 61 and the second heat dissipation portion 62 can be positioned at appropriate positions in the depth direction of the case 5. Therefore, when the sealing resin portion 8 is to be formed, the first heat dissipation portion 61 and the second heat dissipation portion 62 are likely to be prevented from being displaced due to the flow of filling resin. Examples in which the first heat dissipation portion 61 and the second heat dissipation portion 62 are displaced include a case in which they sink toward the inner bottom surface 511 of the case 5, and a case in which they move in the axial direction of the second winding portion 22. This coupling portion 63 makes it possible to handle the first heat dissipation portion 61 and the second heat dissipation portion 62 as an integrated member, and therefore improves the manufacturing workability of the reactor 1D. The coupling portion 63 can also protect the upper surface of the second winding portion 22 from mechanical factors and from the external environment. By being protected from the external environment, the second winding portion 22 is improved in the corrosion resistance properties thereof.

As with the first heat dissipation portion 61 and so on, the coupling portion 63 is formed of a sheet-shaped member. The coupling portion 63 has a rectangular cross-sectional shape. The coupling portion 63 has a uniform thickness in the width direction thereof. The thickness of the coupling portion 63 is the length thereof in the height direction. It is preferable that the length of the coupling portion 63 in the axial direction of the second winding portion 22 is equivalent to the total length of the second winding portion 22 in the axial direction. This is because the coupling portion 63 can cover substantially the entire range of the upper surface of the second winding portion 22.

Note that the area that is in contact with the second winding portion 22, of the lower surface of the coupling portion 63, may be provided with the insulating member 7 (FIG. 3). The coupling portion 63 being made of metal can improve insulation between the coupling portion 63 and the second winding portion 22. The coupling portion 63 may be formed from a plurality of rod members or a plurality of plate members that bridge the first heat dissipation portion 61 and the second heat dissipation portion 62. The plurality of rod members and the plurality of plate members may be provided at intervals in the axial direction of the second winding portion 22. The constituent resin of the sealing resin portion 8 is likely to be filled to the inner bottom surface 511 side of the case 5 through the gap between the rod members of the plate members.

Others

The reactor 1D may have a fixing portion that fixes the coupling portion 63 to the case 5. The fixing portion is omitted from the drawings. If the fixing portion is provided, when the sealing resin portion 8 is to be formed, the coupling portion 63 is prevented from being displaced relative to the case 5 due to the flow of filling resin.

Actions and Effects

In the reactor 1D according to the fourth embodiment, heat from the second winding portion 22 can easily be dissipated from the two side surfaces thereof. This is because, as a result of the coupling portion 63 being provided, the first heat dissipation portion 61 and the second heat dissipation portion 62 can easily be positioned at appropriate positions relative to the second winding portion 22. Therefore, heat from the second winding portion 22 is more likely to be conducted to the side wall portion 52 of the case 5 from the two side surfaces of the second winding portion 22 via the first heat dissipation portion 61 and the second heat dissipation portion 62.

Fifth Embodiment

Reactor

Figure 6:
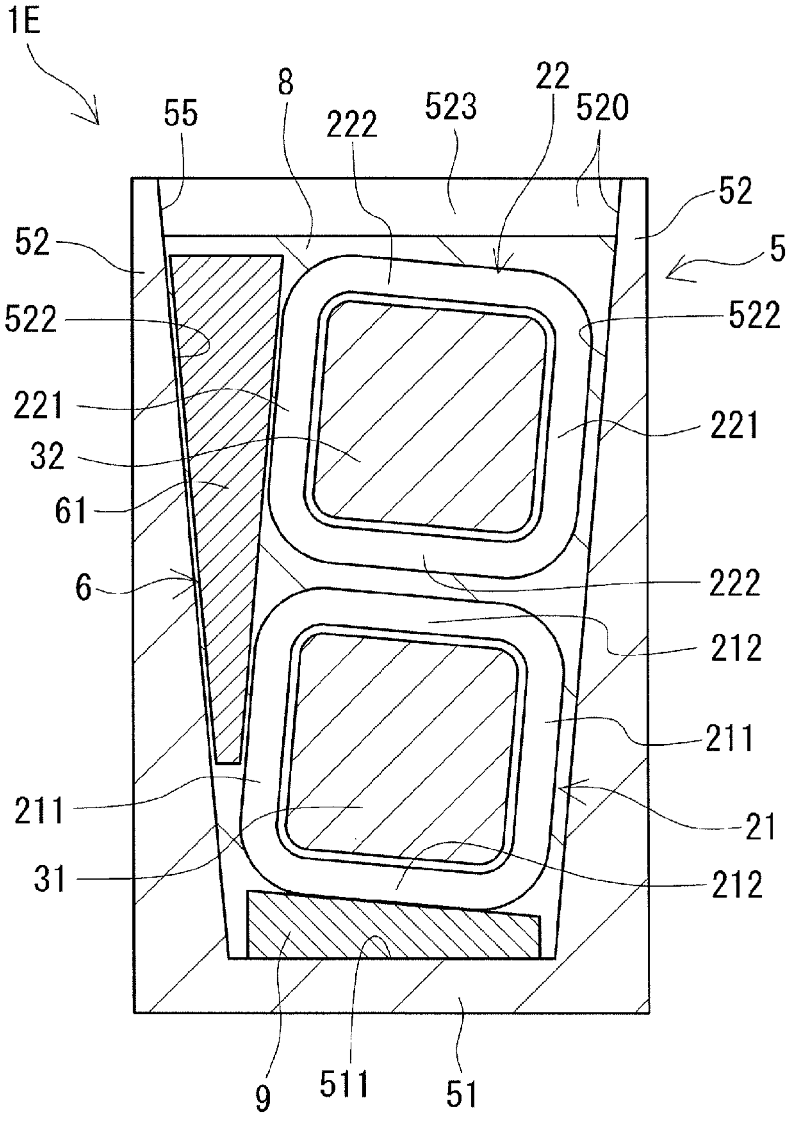
FIG. 6 is a cross-sectional view showing an overview of a reactor according to a fifth embodiment.

A reactor 1E according to a fifth embodiment will be described with reference to FIG. 6. The reactor 1E according to the fifth embodiment is different from the reactor 1A according to the first embodiment in that the first winding portion 21 and the second winding portion 22 are inclined such that one of the side surfaces of each of the first winding portion 21 and the second winding portion 22 (on the right side of the drawing sheet of FIG. 6) comes into contact with one of the inclined surfaces 522, and the heat dissipation member 6 is only provided with the first heat dissipation portion 61. FIG. 6 is a cross-sectional view showing the reactor 1E cut along the same position as in the cross-sectional view in FIG. 2.

Coil

One of the case facing sides 211 of the first winding portion 21 is parallel with one of the inclined surfaces 522. The other of the case facing sides 211 of the first winding portion 21 is not parallel with the other of the inclined surfaces 522. The pair of coupling sides 212 of the first winding portion 21 are not parallel with the inner bottom surface 511. The pair of coupling sides 212 are orthogonal to one of the inclined surfaces 522, and are not orthogonal to the other of the inclined surfaces 522. Similarly, one of the case facing sides 221 of the second winding portion 22 is parallel with one of the inclined surfaces 522. The other of the case facing sides 221 of the second winding portion 22 is not parallel with the other of the inclined surfaces 522. The pair of coupling sides 222 of the second winding portion 22 are not parallel with the inner bottom surface 511. The pair of coupling sides 222 are orthogonal to one of the inclined surfaces 522, and are not orthogonal to the other of the inclined surfaces 522. That is to say, the pair of case facing sides 211 of the first winding portion 21 and the pair of case facing sides 221 of the second winding portion 22 have the same length. The pair of coupling sides 212 of the first winding portion 21 and the pair of coupling sides 222 of the second winding portion 22 have the same length.

It is possible to make the distance between one of the side surfaces of the first winding portion 21 and one of the inclined surfaces 522 uniform, from the inner bottom surface 511 side to the opening 55 side (on the right side of the drawing sheet of FIG. 6). Similarly, it is possible to make the distance between one of the side surfaces of the second winding portion 22 and one of the inclined surfaces 522 uniform, from the inner bottom surface 511 side to the opening 55 side. Also, it is possible to make the distance between one of the side surfaces of the first winding portion 21 and one of the inclined surfaces 522 and the distance between one of the side surfaces of the second winding portion 22 and one of the inclined surfaces 522 be equal to each other. Therefore, the first winding portion 21 and the second winding portion 22 are likely to be uniformly cooled via the side wall portion 52 of the case 5.

In this example, one of the side surfaces of the first winding portion 21 and one of the side surfaces of the second winding portion 22 are in surface contact with one of the inclined surfaces 522 (on the right side of the drawing sheet of FIG. 6). Therefore, the first winding portion 21 and the second winding portion 22 are even more likely to be cooled. In FIG. 6, for the sake of illustration, a gap is provided between one of the side surfaces of each of the first winding portion 21 and the second winding portion 22 and one of the inclined surfaces 522. However, one of the side surfaces of each of the first winding portion 21 and the second winding portion 22 and one of the inclined surfaces 522 are directly in contact with each other.

The other of the side surfaces of the first winding portion 21 and the other of the side surfaces of the second winding portion 22 are not in contact with the other of the inclined surfaces 522 (on the left side of the drawing sheet of FIG. 6). A predetermined gap is provided between the other of the side surfaces of the first winding portion 21 and the other of the inclined surfaces 522 and between the other of the side surfaces of the second winding portion 22 and the other of the inclined surfaces 522. The distance between the other of the side surfaces of the first winding portion 21 and the other of the inclined surfaces 522 gradually increases in a direction from the inner bottom surface 511 side to the opening 55 side. Similarly, the distance between the other of the side surfaces of the second winding portion 22 and the other of the inclined surfaces 522 gradually increases in a direction from the inner bottom surface 511 side to the opening 55 side.

That is to say, as in the first embodiment, the minimal distance between the other of the side surfaces of the second winding portion 22 and the other of the inclined surfaces 522 in the width direction is greater than the maximum distance between the other of the side surfaces of the first winding portion 21 and the other of the inclined surfaces 522 in the width direction. That is to say, the distance between the inner bottom surface 511 side of the other of the side surfaces of the second winding portion 22 and the other of the inclined surfaces 522 in the width direction is longer than the distance between the opening 55 side of the other of the side surfaces of the first winding portion 21 and the other of the inclined surfaces 522 in the width direction.

Heat Dissipation Member

First Heat Dissipation Portion

The first heat dissipation portion 61 is interposed between the other of the inclined surfaces 522 and the other of the side surfaces of the second winding portion 22 (on the left side of the drawing sheet of FIG. 6). The first heat dissipation portion 61 is in contact with the other of the inclined surfaces 522 and the other of the side surfaces of the second winding portion 22. Therefore, heat from the second winding portion 22 is more likely to be conducted to the side wall portion 52 of the case 5 via the other of the side surfaces of the second winding portion 22 as well. Therefore, the first winding portion 21 and the second winding portion 22 are likely to be uniformly cooled via the side wall portion 52 of the case 5. The insulating member 7 (FIG. 3) may be provided on the area that faces the second winding portion 22, of the first heat dissipation portion 61. The first heat dissipation portion 61 may be provided with a protrusion 611 (FIG. 4). The material of the first heat dissipation portion 61 is as described in the first embodiment.

Seat Portion

It is preferable that the reactor 1B is provided with a seat portion 9. The seat portion 9 is disposed on the inner bottom surface 511 of the bottom plate portion 51. The seat portion 9 placed on the inner bottom surface 511 of the bottom plate portion 51 in a state where the first winding portion 21 and the second winding portion 22 are inclined. The seat portion 9 make one of the case facing sides 211 of the first winding portion 21 and one of the case facing sides 221 of the second winding portion 22 be parallel with one of the inclined surfaces 522. That is to say, the upper surface of the seat portion 9 in this example is a surface that extends in a direction that is orthogonal to one of the inclined surfaces 522.

The seat portion 9 in this example is formed as a member separate from the case 5. The seat portion 9 is formed of a sheet-shaped member that substantially supports the entire range of the lower surface of the first winding portion 21. The cross-sectional shape of the seat portion 9 is a right-angled trapezoidal shape. The upper surface of the seat portion 9 is formed as an inclined surface. The height of the seat portion 9 gradually increases in a direction from one of the inclined surfaces 522 to the other of the inclined surfaces 522. In addition, the seat portion 9 may be formed as a protruding member that supports one end side of the lower surface of the first winding portion 21 in the width direction in the axial direction of the first winding portion 21. Note that the seat portion 9 may be constituted by a portion of the case 5. When the seat portion 9 is constituted by a portion of the case 5, the inner bottom surface 511 may be constituted by the aforementioned inclined surface, for example.

As with the material of the case 5, examples of the material of the seat portion 9 include non-magnetic metals and non-metallic materials. When the seat portion 9 is formed of such a material, heat from the first winding portion 21 is more likely to be conducted to the bottom plate portion 51 of the case 5 via the seat portion 9. Therefore, the first winding portion 21 is more likely to be cooled. When the case 5 is formed of a non-magnetic metal, the seat portion 9 may be formed as a non-magnetic metal sheet whose upper surface is coated with a non-metallic material. Such a configuration improves insulation between the first winding portion 21 and the case 5.

Actions and Effects

In the reactor 1E according to the fifth embodiment, heat from the second winding portion 22 can easily be dissipated from the two side surfaces thereof. This is because, as a result of the first winding portion 21 and the second winding portion 22 being inclined, one of the side surfaces of the second winding portion 22 and one of the inclined surfaces 522 are in surface contact with each other. In addition, as a result of the first heat dissipation portion 61 being interposed between the other of the inclined surfaces 522 and the other of the side surfaces of the second winding portion 22, heat from the second winding portion 22 is more likely to be conducted to the side wall portion 52 of the case 5 from the other of the side surfaces of the second winding portion 22 as well.

The present disclosure is not limited to these examples, is indicated by the claims, and is intended to include all modifications within the meaning and scope of the claims.

The invention claimed is:

1. A reactor comprising: an assembly of a coil and a magnetic core; a case that houses the assembly; and a sealing resin portion that is filled into the case to seal at least a portion of the assembly,
- wherein the reactor further comprises a heat dissipation member that is interposed between the coil and the case, the heat dissipation member has an inclined surface,
- the case has
  - an inner bottom surface on which the assembly is placed, and
  - a pair of coil facing surfaces that face side surfaces of the coil,
- the pair of coil facing surfaces respectively have inclined surfaces that are inclined away from each other in a direction from the inner bottom surface side to an opposite side to the inner bottom surface,
- the coil includes
  - a first winding portion that is disposed on the inner bottom surface side, and
  - a second winding portion that is disposed on an opposite side of the inner bottom surface with respect to the first winding portion,
- the first winding portion and the second winding portion are disposed in a vertical arrangement such that axes thereof are parallel with each other,
- the first winding portion and the second winding portion have the same width, and
- the heat dissipation member includes a first heat dissipation portion that is interposed between at least one of the inclined surfaces and the second winding portion, wherein an angle of the inclined surface of the heat dissipation and an angle of the inclined surface of the pair of coil facing surfaces of the case are conjugate angles.

2. The reactor according to claim 1, wherein the heat dissipation member includes a second heat dissipation portion that is interposed between the other of the inclined surfaces and the second winding portion.

3. The reactor according to claim 2, wherein the heat dissipation member includes a coupling portion that is disposed on the second winding portion on an opposite side to the first winding portion, and couples the first heat dissipation portion and the second dissipation portion to each other.

4. The reactor according to claim 1, wherein the inner bottom surface is a flat surface,
- end surfaces of the first winding portion and the second winding portion
  - each have a rectangular frame shape, and
  - each have a pair of case facing sides that face the inclined surfaces and extend in a vertical direction, and a pair of coupling sides that couple respective proximal ends and respective distal ends of the pair of case facing sides to each other, and
- the pair of coupling sides are parallel with the inner bottom surface.

5. The reactor according to claim 1, wherein end surfaces of the first winding portion and the second winding portion each have a rectangular frame shape, and each have a case facing side that faces, and is parallel with, one of the inclined surfaces, and another case facing side that faces, and is not parallel with, the other of the inclined surfaces; and
- the first heat dissipation portion is interposed between the other of the inclined surfaces and the other case facing side of the second winding portion.

6. The reactor according to claim 1, wherein the heat dissipation member has a protrusion that is interposed between the first winding portion and the second winding portion.

7. The reactor according to claim 1, wherein the heat dissipation member has a thermal conductivity no less than 1 W/mK.

8. The reactor according to claim 1, wherein an angle formed by the inner bottom surface and each of the inclined surfaces is no less than 91 degrees and no greater than 95 degrees.

* * * * *